Oct. 1, 1963 M. C. BARKER 3,105,720
PNEUMATIC CONVEYING SYSTEM
Filed Oct. 3, 1960 4 Sheets-Sheet 2
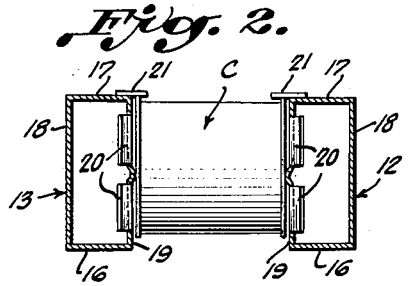
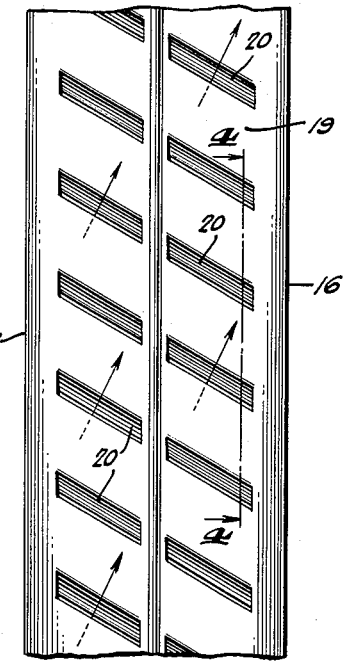
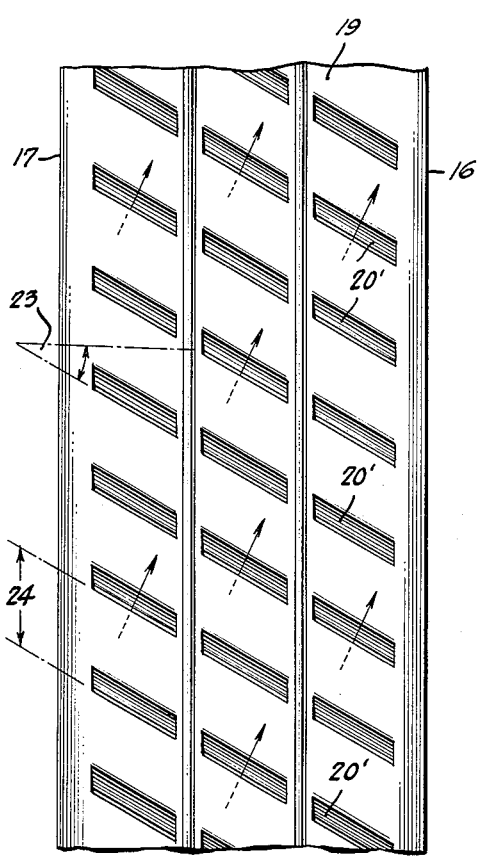
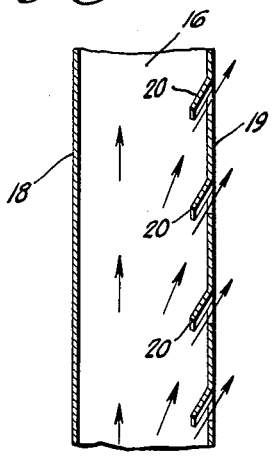
INVENTOR
MAYNARD C. BARKER
BY
ATTORNEY Oct. 1, 1963

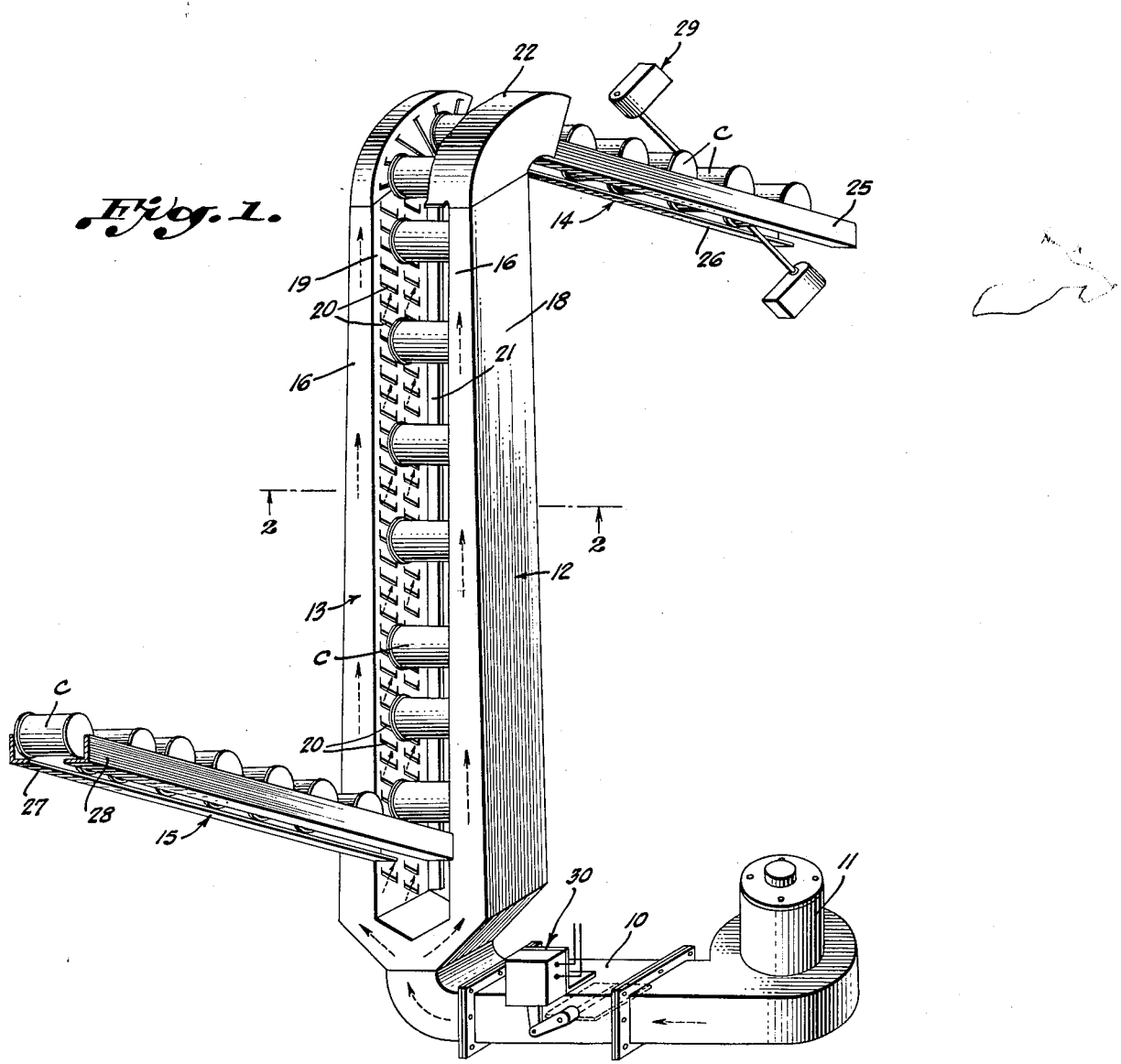

M. C. BARKER 3,105,720

PNEUMATIC CONVEYING SYSTEM

Filed Oct. 3, 1960

INVENTOR
MAYNARD C. BARKER
BY
ATTORNEY

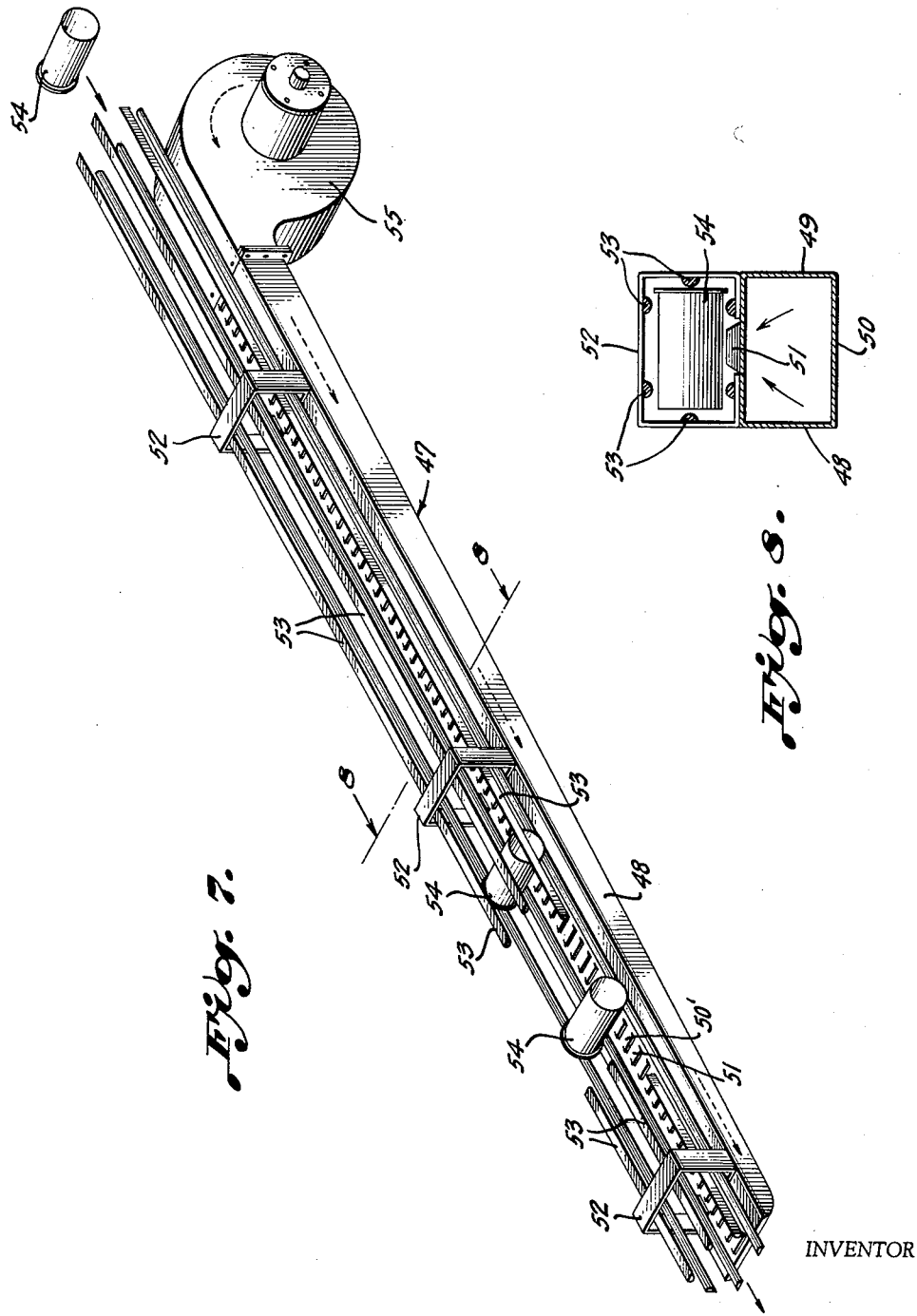

United States Patent Office 3,105,720
Patented Oct. 1, 1963

3,105,720
PNEUMATIC CONVEYING SYSTEM
Maynard C. Barker, Tampa, Fla., assignor to
The Barker Company, Tampa, Fla.
Filed Oct. 3, 1960, Ser. No. 59,904
5 Claims. (Cl. 302—2)

The present invention relates to a novel apparatus for conveying or transferring articles from one point to another and more particularly to a novel apparatus for pneumatically conveying or transferring cans, containers or similarly shaped articles or packages.

The present invention contemplates a novel apparatus for conveying cans, containers or the like from one point to another by means of air pressure in place of conventional mechanical means such as belts, chains, cables or the like. The advantages of this novel construction are enumerated below.

There is a constant propelling force from the point of infeed to the conveyor to the point of discharge. There is no mechanical damage to the articles due to impact with mechanical conveyors such as belts, chains, cables and the like. There is low container damage due to contact between adjacent containers when employing mechanical conveyors. The use of pneumatic conveying means provides for cooling of the containers when fed from ovens, bodymakers and the like. The present construction provides for low initial cost of the apparatus and low maintenance costs as well as utilization of minimum space occupation.

A primary object of the present invention is, therefore, to provide a novel air pressure conveyor for containers and the like whereby the use of mechanical means for conveying the containers are eliminated. Thus, there is low container damage due to direct contact between adjacent containers and less damage due to contact with belts, chains, cables and the like.

A further object of the present invention is to provide a conveyor which will assure the transporting of articles in a constant supply.

Another object of the invention is to provide a pneumatic conveyor which may be readily adapted to articles of different size and weight.

A further advantage of the present invention resides in the fact that the use of an air stream for conveying the containers results in a cooling of the containers in those instances where the containers come from baking ovens, bodymakers and the like.

Further advantages of the present invention reside in low initial costs, low maintenance costs, and small area section for efficient space utilization.

Other objects and advantages of the present invention will become apparent from the following description taken in conjunction with the accompanying drawings, wherein:

FIGURE 1 is a perspective view of one embodiment of the invention.

FIGURE 2 is a sectional view taken on the line 2—2 of FIGURE 1.

FIGURE 3 is an enlarged elevational view of a portion of the manifold shown in FIGURE 1, with the louvered plate shown in detail.

FIGURE 4 is a sectional view taken on the line 4—4 of FIGURE 3.

FIGURE 5 is a slightly modified form of the louvered plate shown in FIGURE 4.

FIGURE 7 is a perspective view of a further modification of a conveyor.

FIGURE 8 is a sectional view taken on the line 8—8 of FIGURE 7.

Figure 6:
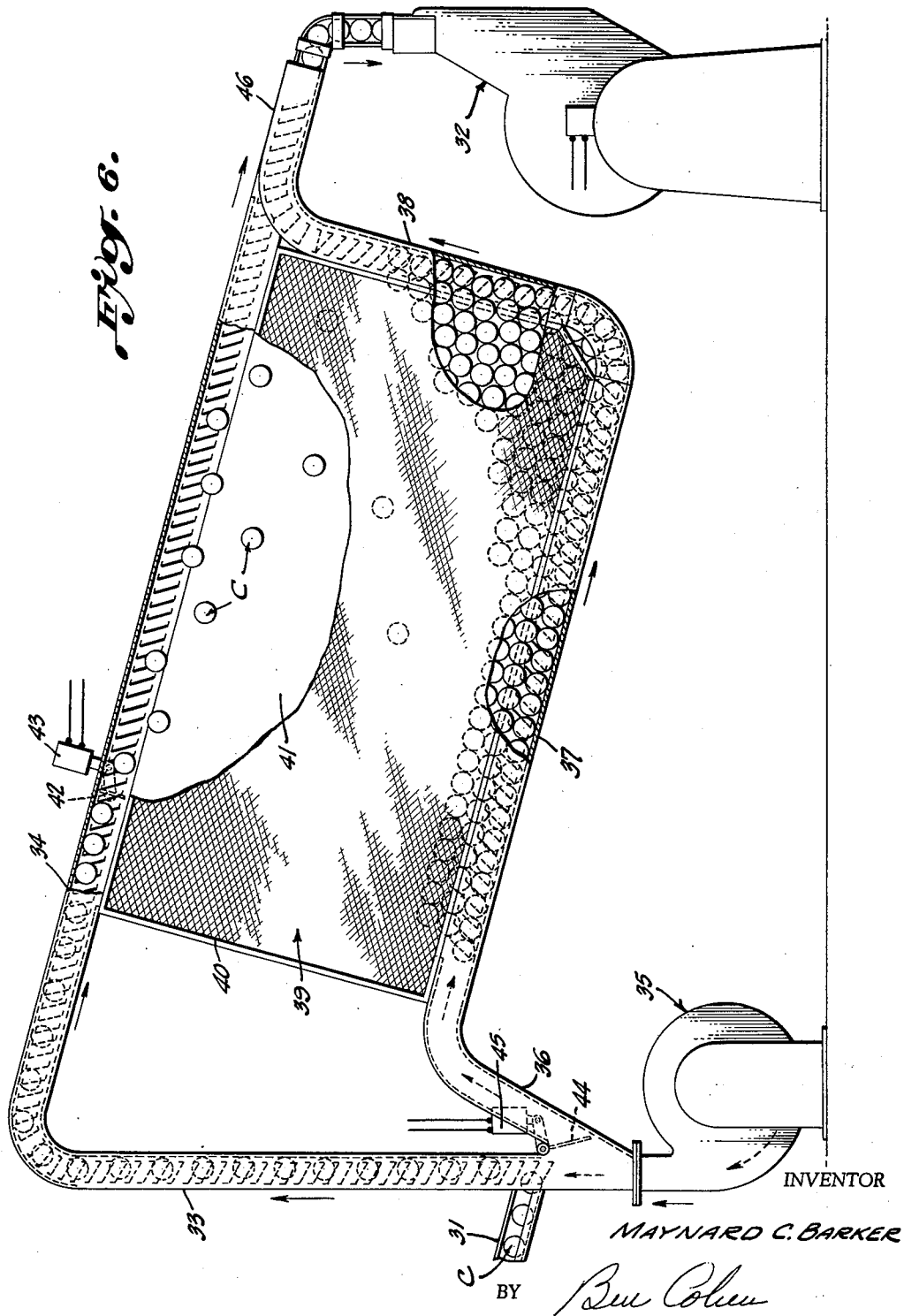
FIGURE 6 is a perspective view of a modified conveying apparatus.

Referring to the drawings in detail wherein like numerals designate like parts throughout the several views, and particularly to the modification disclosed in FIGURES 1 to 5, showing an elevating conveyor for cans C, the apparatus comprises generally a duct 10 connected to a blower type fan 11. The duct 10 leads to two spaced parallel manifolds 12 and 13, and at the upper end of the manifolds, a gravity conveyor 14 leads to the destination of the cans. A gravity conveyor 15 feeds the cans to the lower end of the conveyor as seen in FIGURE 1.

The two vertical manifolds are similarly constructed and each comprises a hollow rectangular shaped duct formed of solid front, rear and back walls 16, 17 and 18 and a louvered inner wall 19. The louvers 20 are formed by upsetting the material of the inner wall and bending said material inwardly as seen in FIGURE 4. In the form of the invention disclosed in FIGURES 1 to 4 inclusive, each of the ducts 12 and 13 is provided with two rows of louvers 20. However, as shown in FIGURE 5 three rows of louvres 20' are provided and if necessary more than three rows of louvres may be used. As seen in FIGURES 1 and 2, rails 21 are provided at the inner edge of the rear wall of each manifold to confine the cans in the air stream. A cap 22, shown broken away in FIGURE 1, is provided at the top of the two manifolds to direct the cans to the conveyor 14.

As seen in FIGURE 4, the louvres 20 are directed inwardly to permit the air to pass from the manifolds to the air stream between the manifolds to lift the cans to the top of the conveyor. The angle between each of the louvres 20 and the wall 19 is variable at manufacture to provide for the most efficient flow and direction change of the air stream to accommodate a particular shape, weight or size of container. As seen in FIGURE 5, the louvre openings are at an angle 23 to the horizontal and this angle is also variable under certain conditions depending upon the article to be conveyed. The distance 24 between the louvre openings in each row is also variable to suit package specification differentials.

Referring to FIGURE 1, the conveyor 14 comprises a pair of spaced L-shaped rails 25 and 26. The feed conveyor 15 also comprises a pair of spaced L-shaped rails 27 and 28. An appropriate photo-electric or equivalent type switch 29 is positioned on conveyor 14 and is suitably connected to a solenoid valve 30 for a purpose to be described as follows:

The air induced by the blower fan 11 is directed through the manifolds 12 and 13. The air, under moderate pressure, discharges from the louvres in an upward and rearward direction. The containers or cans enter by means of gravity to the lower part of the air stream and the air stream carries the cans upward to discharge from the elevator. In the event that too many cans are backed up in the discharge conveyor 14, switch 29 causes solenoid valve 30 to close thereby interrupting the air stream and causes the cans to stop being raised.

In the modification disclosed in FIGURE 6, the principle involved is the same as the previous form described except that means are provided for accumulating the cans and assuring a constant supply thereof. The various conveyors are constructed in the same manner generally as shown by manifolds 12 and 13 and no detailed description of the conveyors is required except with respect to certain details which will appear as the description proceeds.

The cans are fed to the conveyor by any suitable feed 31 and are conveyed to a suitable flanger or other machine indicated by numeral 32. Numeral 33 indicates a vertical air conveyor leading to a horizontally inclined air conveyor 34 which in normal use conveys the cans to the machine 32. Numeral 35 indicates the blower for producing the necessary air stream. At the point of entry of the cans C to the vertical conveyor, a separate duct 36 is provided which leads to a horizontally inclined air conveyor 37 which in turn leads to an inclined air conveyor 38 which joins the air conveyor 34 adjacent its outlet end as indicated in FIGURE 6. The two air conveyors 34 and 37 are substantially parallel with each other and define the top and bottom walls of a substantially rectangular accumulator generally indicated by numeral 39. The conveyor 38 defines one end wall of the accumulator 39 and 40 defines the rear end wall thereof. Parallel side plates 41, preferably in the form of expanded metal or wire screen glass members complete the accumulator casing and are spaced apart a distance slightly greater than the height of the cans whereby the cans are stacked oriented upon each other when piled up in the accumulator.

Numeral 42 denotes a solenoid operated butterfly valve extending across the conveyor 34 and controlled by a switch 43 to shut off the air stream when the valve 42 is closed. A similar valve 44, controlled by switch 45, is normally closed as indicated in FIGURE 6.

In normal operation, the blower 35 will cause the cans to move upwardly along the conveyor 33 into conveyor 34, and the direction of the air stream is such that the cans are held against the upper flanges of the conveyor 34 until they reach the end of the conveyor at duct 46 and drop into the machine 32. If the machine 32 is shut down, and the flow of cans to the machine is stopped, the cans in conveyor 34 will fall downward into the accumulator to a stationary single layered stack until the accumulator 39 fills up in which event, blower 35 will shut off and further conveying is stopped until machine 32 resumes operation. When operation is resumed, valve 44 will open, valve 42 will close through suitable switching operations and the air stream is directed through duct 36 to conveyors 37 and 38 thereby feeding the cans in the accumulator to duct 46 and from there to machine 32. When the stack in the accumulator reaches a low level point indicated by a photo-electric or other type low level control, then valve 44 closes and valve 42 opens permitting the cans to move in its normal course through conveyors 33 and 34 to duct 46 whereby they drop into the machine 32.

FIGURES 7 and 8 disclose a section of a simplified form of horizontal conveyor for pneumatically advancing containers or similar objects from one point to another in a conveying system. In this form of the invention, a single manifold is shown.

The manifold comprises a rectangular shaped duct formed of solid side walls and bottom wall indicated by numerals 48, 49 and 50, and a top wall 50' having louvers 51 formed in the central portion thereof as shown in said figures. Suitably secured to the top wall and spaced along the length thereof are a plurality of C-shaped frame members 52 for supporting a plurality of rods 53 thereby forming an open cage structure for confining the containers or similar object 54 during its passage along the upper surface of the conveyor. Numeral 55 denotes a blower type fan for supplying air under pressure to the duct 47. It may thus be seen that the air issuing through louvers 51 will sustain the object 54 in a suspended condition upon a cushion of air and the direction of the openings formed by the louvers will propel the objects from one end of the duct to the other. The rods 53 will serve to confine the objects in a longitudinal direction and since the rods are relatively thin, there will be very little contact between the cage and the objects. It will be understood that the shape of the cage structure may be varied depending upon the shape of the objects being conveyed.

From the foregoing description, it is readily apparent that the present invention has provided a novel apparatus fully capable of performing the objects and advantages set forth. While preferred embodiments of the present invention have been shown and described, it is obvious that changes may be made in the structural details of the forms shown without departing from the spirit of the invention except as may be required by the scope of the appended claims.

Having thus described the invention, what is claimed is:

1. An apparatus for conveying containers pneumatically from one point to another comprising an air blower, a pair of spaced manifolds through which air is blown from the air blower, said manifolds being parallel to each other and spaced apart a distance slightly greater than the height of the containers being conveyed, a complementary flange formed on each of the manifolds and extending into the space therebetween, slots formed in the confronting faces of the manifolds, said slots being inclined towards said flanges to direct the air against said flanges, and means for feeding containers to the space between said manifolds whereby the blown air will convey the containers along said manifolds.

2. An apparatus as defined in claim 1, said manifolds being vertically positioned.

3. An apparatus for conveying containers pneumatically from one point to another comprising an air blower, a plurality of ducts leading from said air blower, one of said ducts leading to a pair of vertically disposed spaced manifolds having a space therebetween to receive the containers to be conveyed, said manifolds having confronting faces provided with openings therein through which air is blown, a valve in said other duct for preventing the passage of air, a pair of downwardly inclined manifolds connected to said first pair of manifolds, a valve in said inclined manifolds for preventing the passage of air therethrough, a second pair of manifolds leading from said second duct and spaced a distance below said first set of inclined manifolds, said lower pair of manifolds merging with a pair of vertically inclined manifolds terminating at a point in said first pair of inclined manifolds, and an accumulator housing positioned between said upper and lower manifolds for accumulating containers dropping from said upper pair of inclined manifolds.

4. An apparatus as defined in claim 3, in which the manifolds have confronting faces provided with openings therein.

5. An apparatus as defined in claim 4, wherein the openings in the manifolds are in the form of slots, a flange on each manifold for containing the containers within the manifolds, said openings being inclined towards said flanges.

References Cited in the file of this patent
UNITED STATES PATENTS

| | | |
|---|---|---|
| 1,161,346 | Schmidt | Nov. 23, 1915 |
| 2,342,680 | Melzer | Feb. 29, 1944 |
| 2,781,232 | Smith | Feb. 12, 1957 |